(12) United States Patent
Barton et al.

(10) Patent No.: US 7,673,343 B1
(45) Date of Patent: Mar. 2, 2010

(54) ANTI-VIRUS SCANNING CO-PROCESSOR

(75) Inventors: Chris A. Barton, Buckingham (GB);
James M. Vignoles, Aylesbury (GB);
James W. Lawrence, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 864 days.

(21) Appl. No.: 09/916,929

(22) Filed: Jul. 26, 2001

(51) Int. Cl.
*G06F 12/14* (2006.01)
*G06F 21/00* (2006.01)

(52) U.S. Cl. .......................................... 726/24; 713/188
(58) Field of Classification Search ................. 713/200, 713/188, 193; 726/24
See application file for complete search history.

(56) References Cited

U.S. PATENT DOCUMENTS

| | | | | |
|---|---|---|---|---|
| 5,696,822 | A * | 12/1997 | Nachenberg | 713/200 |
| 5,918,008 | A * | 6/1999 | Togawa et al. | 713/200 |
| 5,960,170 | A * | 9/1999 | Chen et al. | 714/38 |
| 5,964,889 | A * | 10/1999 | Nachenberg | 714/25 |
| 5,999,723 | A * | 12/1999 | Nachenberg | 703/22 |
| 6,011,537 | A * | 1/2000 | Slotznick | 715/733 |
| 6,016,553 | A | 1/2000 | Schneider et al. | 714/21 |
| 6,272,533 | B1 | 8/2001 | Browne | 709/213 |
| 6,347,375 | B1 * | 2/2002 | Reinert et al. | 713/200 |
| 6,728,964 | B1 * | 4/2004 | Butt | 719/313 |
| 6,735,700 | B1 * | 5/2004 | Flint et al. | 713/200 |
| 6,748,534 | B1 * | 6/2004 | Gryaznov et al. | 713/188 |
| 6,763,466 | B1 * | 7/2004 | Glover | 713/200 |
| 6,973,577 | B1 * | 12/2005 | Kouznetsov | 726/25 |
| 7,010,807 | B1 | 3/2006 | Yanovsky | 726/24 |
| 7,346,928 | B1 * | 3/2008 | Muhlestein | 726/24 |
| 2001/0007120 | A1 * | 7/2001 | Makita | 711/112 |
| 2002/0191599 | A1 * | 12/2002 | Parthasarathy et al. | 370/389 |
| 2002/0194212 | A1 * | 12/2002 | Grupe | 707/500 |
| 2002/0199116 | A1 | 12/2002 | Hoene et al. | 713/201 |
| 2003/0191957 | A1 * | 10/2003 | Hypponen et al. | 713/200 |

FOREIGN PATENT DOCUMENTS

WO 98/45778 10/1998

OTHER PUBLICATIONS

Snavely, Allan; Tullsen, Dean M. Symbiotic Jobscheduling for a Simultaneous Mulithreading Processor. Published in the Proceedings of ASPLOS IX. Nov. 2000.*

Office Action Summary from U.S. Appl. No. 09/916,600 which was mailed on Jan. 13, 2005.

(Continued)

*Primary Examiner*—Michael Pyzocha
(74) *Attorney, Agent, or Firm*—Zilka-Kotab, PC

(57) ABSTRACT

A system, method and computer program product are provided for scanning data. Initially, scanning control logic is executed utilizing a central processing unit. A request related to data is then identified at the central processing unit. In response to the request, the data is indicated to a scanning co-processor coupled to the central processing unit so that the data is scanned by the scanning co-processor under the control of the scanning control logic. The central processing unit then waits for results from the scanning co-processor. Additional logic is executed utilizing the central processing unit while waiting for the results from the scanning co-processor. An event is then initiated based on the results from the scanning co-processor. By this design, the scanning co-processor offloads intensive scanning operations from the central processing unit.

38 Claims, 6 Drawing Sheets

OTHER PUBLICATIONS

Final Office Action from U.S. Appl. No. 09/916,600 which was mailed on Mar. 22, 2005.
Examiner's Answer from U.S. Appl No. 09/916,600 mailed on Jun. 23, 2008.
Examiner's Answer from U.S. Appl. No. 09/916,600 mailed on Jan. 29, 2007.
Notice of Allowance from U.S. Appl. No. 09/916,600 mailed on Sep. 23, 2009.

* cited by examiner

ANTI-VIRUS SCANNING CO-PROCESSOR

FIELD OF THE INVENTION

The present invention relates to computer scanning methods, and more particularly to scanning data for viruses and malicious content.

BACKGROUND OF THE INVENTION

Security systems often employ security risk-assessment tools, i.e. "scanners," to protect against an attack against computer systems. Such scanners can probe for weaknesses by simulating certain types of security events that make up an attack. Such tools can also test user passwords for suitability and security. Moreover, scanners can search for known types of security events in the form of malicious programs such as viruses, worms, and Trojan horses. Further, scanners are used for content filtering to enforce an organization's operational policies [i.e. detecting harassing or pornographic content, junk e-mails, misinformation (virus hoaxes), etc.].

Prior art FIG. 1 illustrates an anti-virus multiprocessor system 100 including a scanning co-processor 102 attached to a first processor 104 for monitoring the performance thereof, and intervening if predefined behavior is detected. The multiprocessor system 100 further includes memory 106 and various input/output devices 108.

Prior art FIG. 2 illustrates the method 200 by which the anti-virus multiprocessor system 100 of FIG. 1 operates. The scanning co-processor 102 includes logic for carrying out the various steps of method 200. In use, the co-processor 102 continuously supervises the operation of the first processor 104 to detect virus-related activities therein. Note operation 202. In particular, actual performed instructions in the first processor 104 are compared with instruction sequences corresponding to known viruses or to predefined suspect behavior. Note operation 204.

In operation 206, the co-processor 102 stops the logic running on the first processor 104 after a virus detection. Specifically, actions are taken in real time when a forbidden action takes place, to prevent damage to applications running on the first processor 104. More information regarding such method 200 may be found with reference to a PCT application entitled "ANTIVIRUS SYSTEM AND METHOD" filed Apr. 8, 1998 under PCT application number PCT/IL98/00170.

Unfortunately, the foregoing system 100 does not read the malicious code and does not make any attempt to repair or quarantine the same. Further, the system 100 does not address the fact that virus scanning inherently uses up a large proportion of system resources in the form of cycles in the first processor 104. The system 100 of FIG. 1 merely serves to supervise the operation of the first processor 104, and is not designed to effectively offload the first processor 104 to improve overall system performance.

DISCLOSURE OF THE INVENTION

A system, method and computer program product are provided for scanning data. Initially, scanning control logic is executed utilizing a central processing unit. A request related to data is then identified at the central processing unit. In response to the request, the data is indicated to a scanning co-processor coupled to the central processing unit so that the data is scanned by the scanning co-processor under the control of the scanning control logic. The central processing unit then waits for results from the scanning co-processor. Additional logic is executed utilizing the central processing unit while waiting for the results from the scanning co-processor. An event is then initiated based on the results from the scanning co-processor. By this design, the scanning co-processor offloads intensive scanning operations from the central processing unit.

In one embodiment, the central processing unit may be coupled to the scanning co-processor via a bus. Further, the scanning control logic may include hardware. As an option, the scanning control logic may be stored on the scanning co-processor. Moreover, the scanning control logic may include software, and may be stored in memory. Optionally, the scanning co-processor may include memory with virus signatures and/or rule sets stored in such memory. As such, the scanning co-processor may be adapted to perform content and/or virus scanning under the control of the scanning control logic.

As an option, it may be determined whether the data meets a predetermined criteria. Further, the data may be sent to the scanning co-processor if it is determined that the data meets the predetermined criteria.

In another embodiment, the event may be initiated under the control of the scanning control logic. Further, the data may be processed utilizing the central processing unit upon the receipt of favorable results from the scanning co-processor. Still yet, additional data to be scanned by the scanning co-processor may be queued while waiting for the results from the scanning co-processor. Further, the present technique may be carried out utilizing a multi-threading algorithm.

BRIEF DESCRIPTION OF THE DRAWINGS

Prior art

Prior art

DESCRIPTION OF THE PREFERRED EMBODIMENTS

Figure 1:
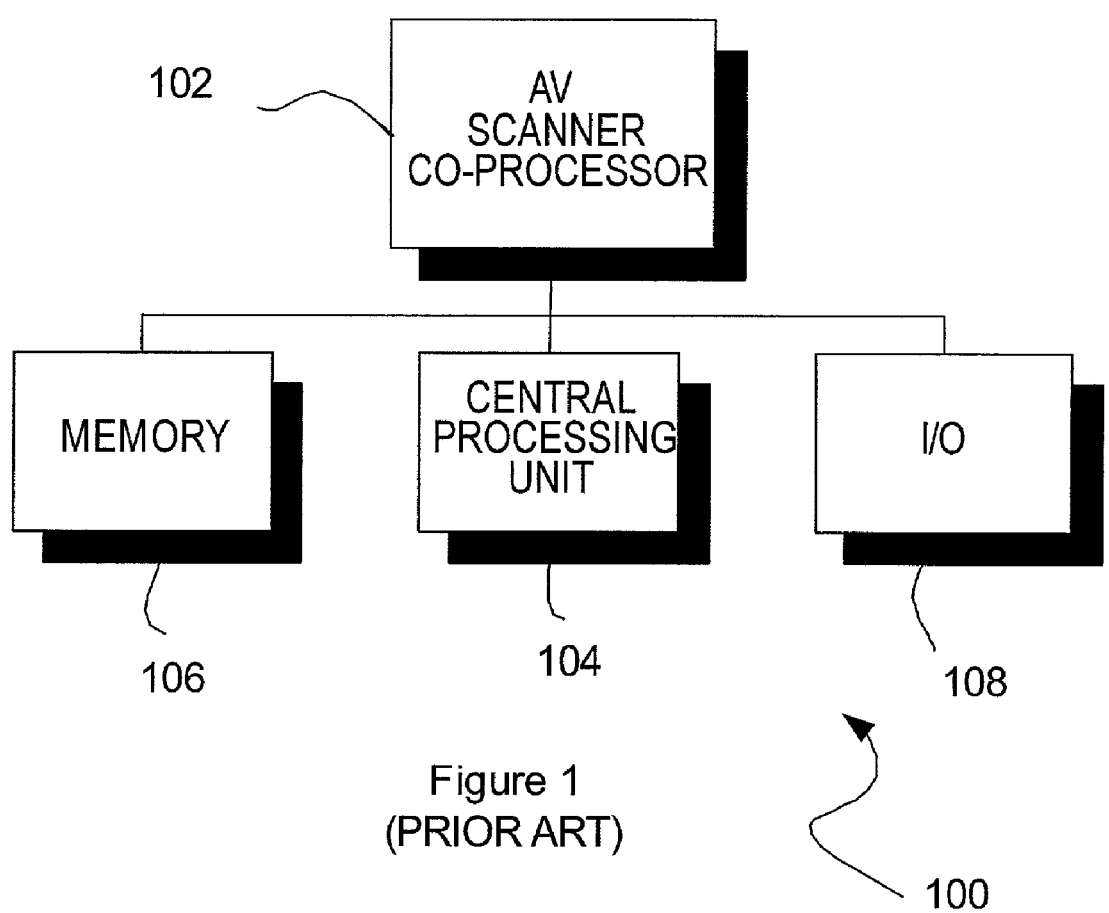
FIG. 1 illustrates an anti-virus multiprocessor system including a co-processor attached to a first processor for monitoring the performance thereof, and intervening if predefined behavior is detected.
Figure 2:
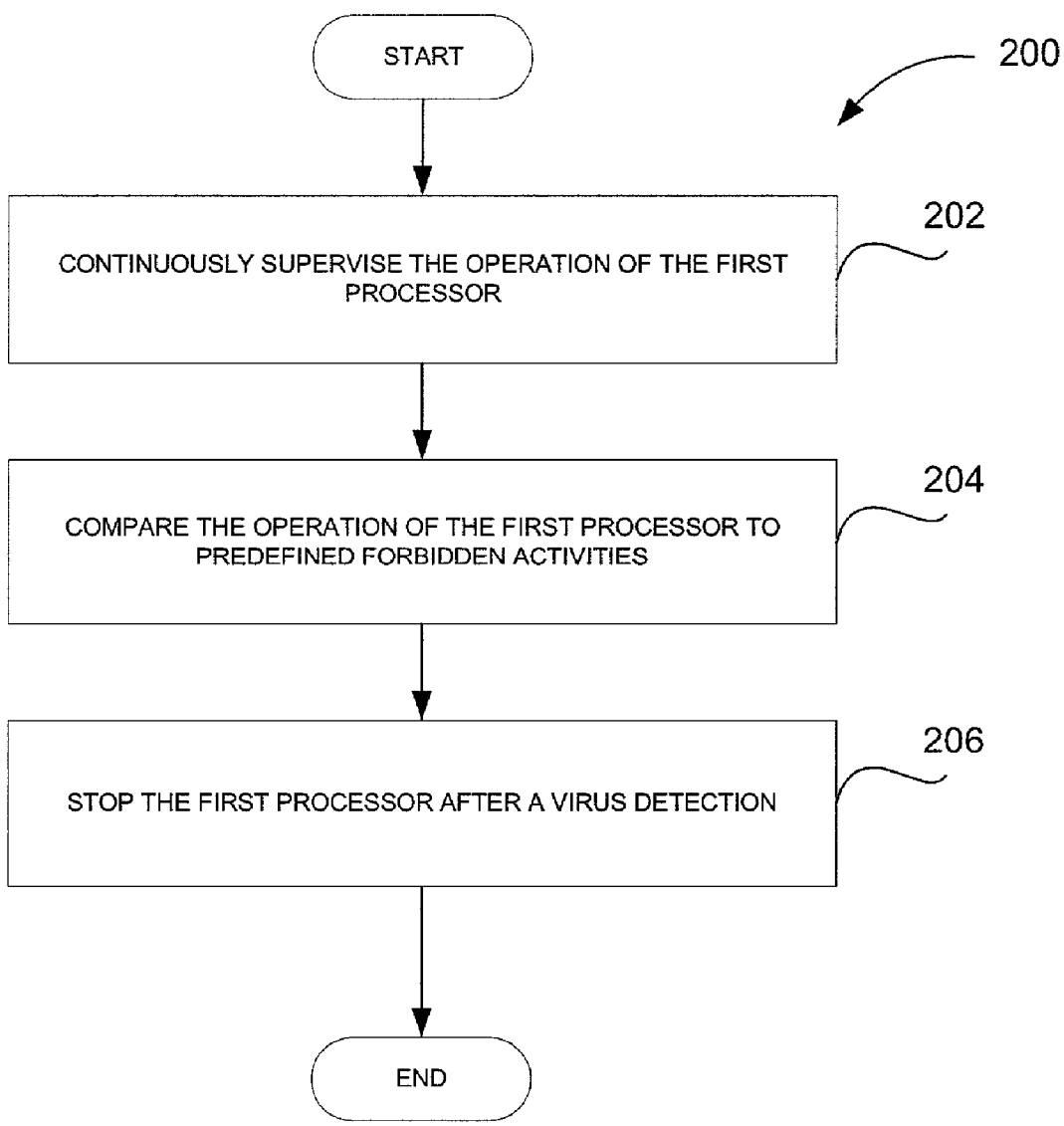
FIG. 2 illustrates the method by which the anti-virus multiprocessor system of FIG. 1 operates.
Figure 3:
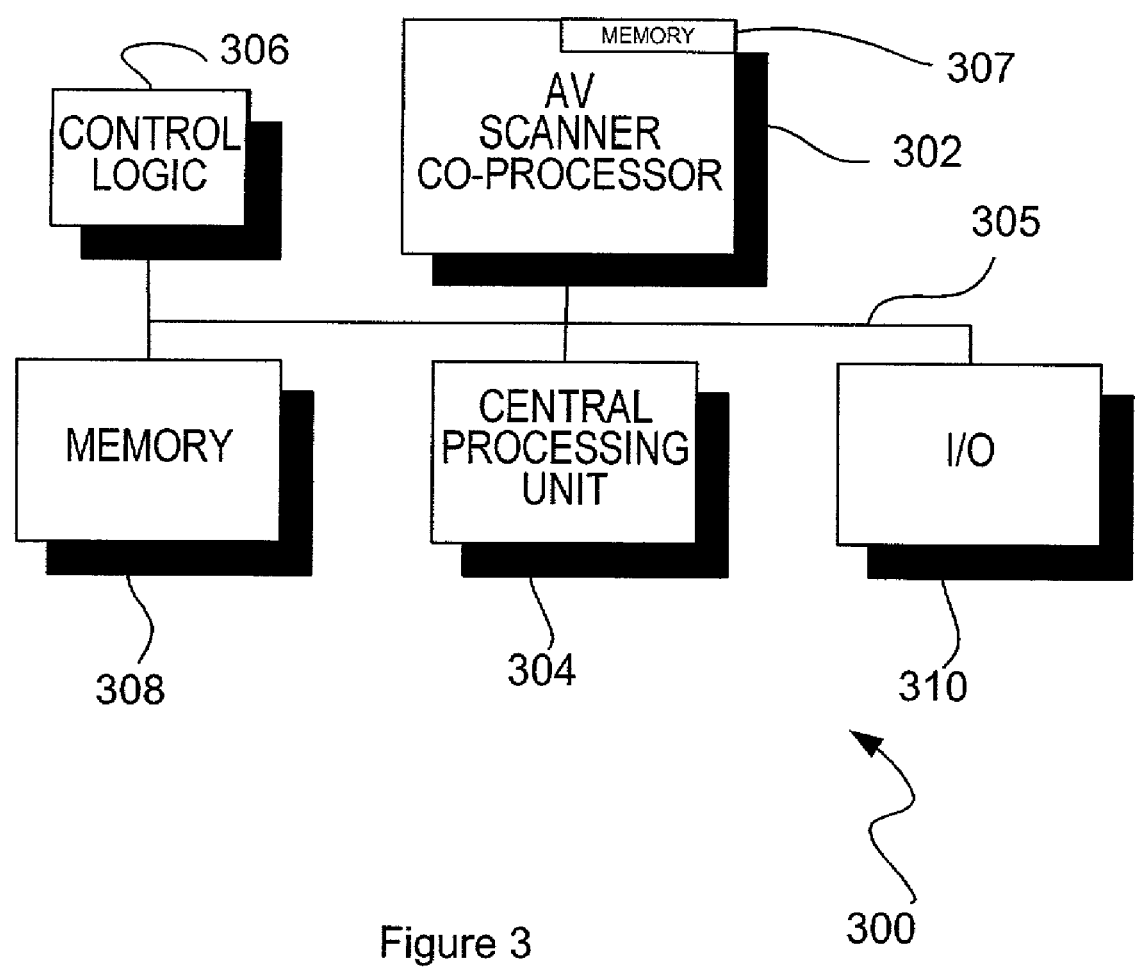
FIG. 3 illustrates an anti-virus multiprocessor system, in accordance with one embodiment.

FIG. 3 illustrates an anti-virus multiprocessor system 300, in accordance with one embodiment. As shown, a scanning co-processor 302 is attached to a central processing unit 304 for offloading the central processing unit 304. As an option, the scanning co-processor 302 may take the form of an application specific integrated circuit (ASIC) or any other type of dedicated hardware.

As shown in FIG. 3, the central processing unit 304 may be coupled to the scanning co-processor 302 via a bus 305. In embodiment, the bus 305 employs direct memory access (DMA) technology and/or any other technologies. Further, the anti-virus multiprocessor system 300 may include various input/output devices 310. In use, the scanning co-processor 302 serves to perform most if not the entire intensive virus and content scanning that would otherwise be performed on the central processing unit 304. As an option, the scanning co-processor 302 may be capable of performing more than one scan at a time.

To accomplish this, the scanning co-processor 302 may be equipped with virus signatures and/or rule sets to perform virus scanning and/or content/image scanning, respectively. It should be noted that the scanning co-processor 302 may be equipped with any ability to identify the contents of files such as recursive scanning, decoding/encoding of file formats or conversion formats, or image recognition. For example, such image recognition may be used to detect pornography by way of fractal image recognition, etc.

In one embodiment, the virus signatures and/or rule sets are stored in memory 307 integral with the scanning co-processor 302. As an option, the virus signatures and/or rule sets may be stored in any desired memory separate from the scanning co-processor 302. Such memory 307 may include random access memory (RAM), read only memory (ROM), a hard drive, and/or any other type of memory. In one example, the memory 307 may be shared with the central processing unit 304, or include separate memory 307 dedicated to the scanning co-processor 302. In operation, the scanning co-processor 302 applies the rule sets, and/or conducts a comparison involving the virus signatures.

As an option, the virus signatures and/or content/image analysis rule sets may be updated manually and/or automatically per the user or software logic running by a bios. In one embodiment, such signatures and/or rule sets may be updated via a network on a periodic basis utilizing a remote server.

To control the operation of the scanning co-processor 302, scanning control logic 306 is included for being executed on the central processing unit 304. In various other embodiments, the scanning control logic 306 may be run by the scanning co-processor 302, or any other desired device. It should be noted that the scanning control logic 306 may include hardware and/or software.

In one embodiment where the scanning control logic 306 includes software, the scanning control logic 306 may be stored in memory 308 coupled to the scanning co-processor 302 and the central processing unit 304 via bus 305. Such memory 308 may include random access memory (RAM), read only memory (ROM), a hard drive, and/or any other type of memory. As an option, the scanning control logic 306 may be stored in the memory 307 integral with the scanning co-processor 302. Still yet, the scanning control logic 306 may include stand-alone logic coupled to the bus 305 or directly to the scanning co-processor 302. Further, the scanning control logic 306 may be common with the central processing unit 304.

In use, the scanning control logic 306 is capable of being executed by the central processing unit 304, and interfacing with an operating system on the central processing unit 304. In particular, the scanning control logic 306 is capable of identifying requests to access/write data from/to memory 308 or a network, process data, execute application programs, and/or any other requests involving data that may make the system 300 vulnerable to viruses or malicious software. As mentioned earlier, such memory 308 may include random access memory (RAM), read only memory (ROM), a hard drive, and/or any other type of storage device. Once an event occurs that warrants scanning, the scanning control logic 306 is capable of sending a request to the scanning co-processor 302 to utilize the virus signatures and/or rule sets to scan data. In the context of the present description, data refers to any file, application program, or any other data capable of being read and/or executed by a computer.

Figure 4:
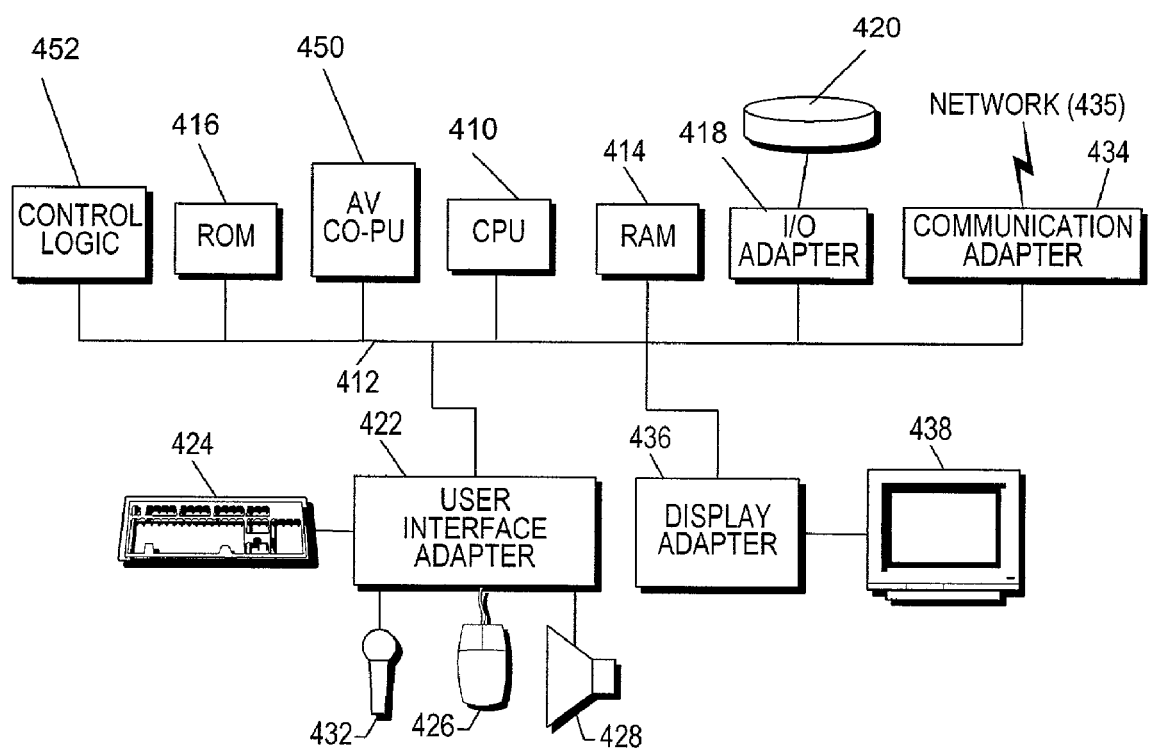
FIG. 4 shows a more comprehensive hardware environment that may be employed in the context of one embodiment.

FIG. 4 shows a more comprehensive hardware environment that may be employed in the context of one embodiment. Such figure illustrates a hardware configuration of a server, firewall, or workstation having a central processing unit 410, such as a microprocessor, and a number of other units interconnected via a system bus 412.

The present hardware shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the present hardware to a communication network 435 (e.g., a data processing network) and a display adapter 436 for connecting the bus 412 to a display device 438. Also included is a scanning co-processor 450 and scanning control logic 452 coupled to the bus 412 for operating in a manner similar to the scanning control logic 306 set forth during reference to FIG. 3. It should be noted that the present hardware is set forth for illustrative purposes only, and should not be construed as limiting in any manner.

The present hardware may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 5:
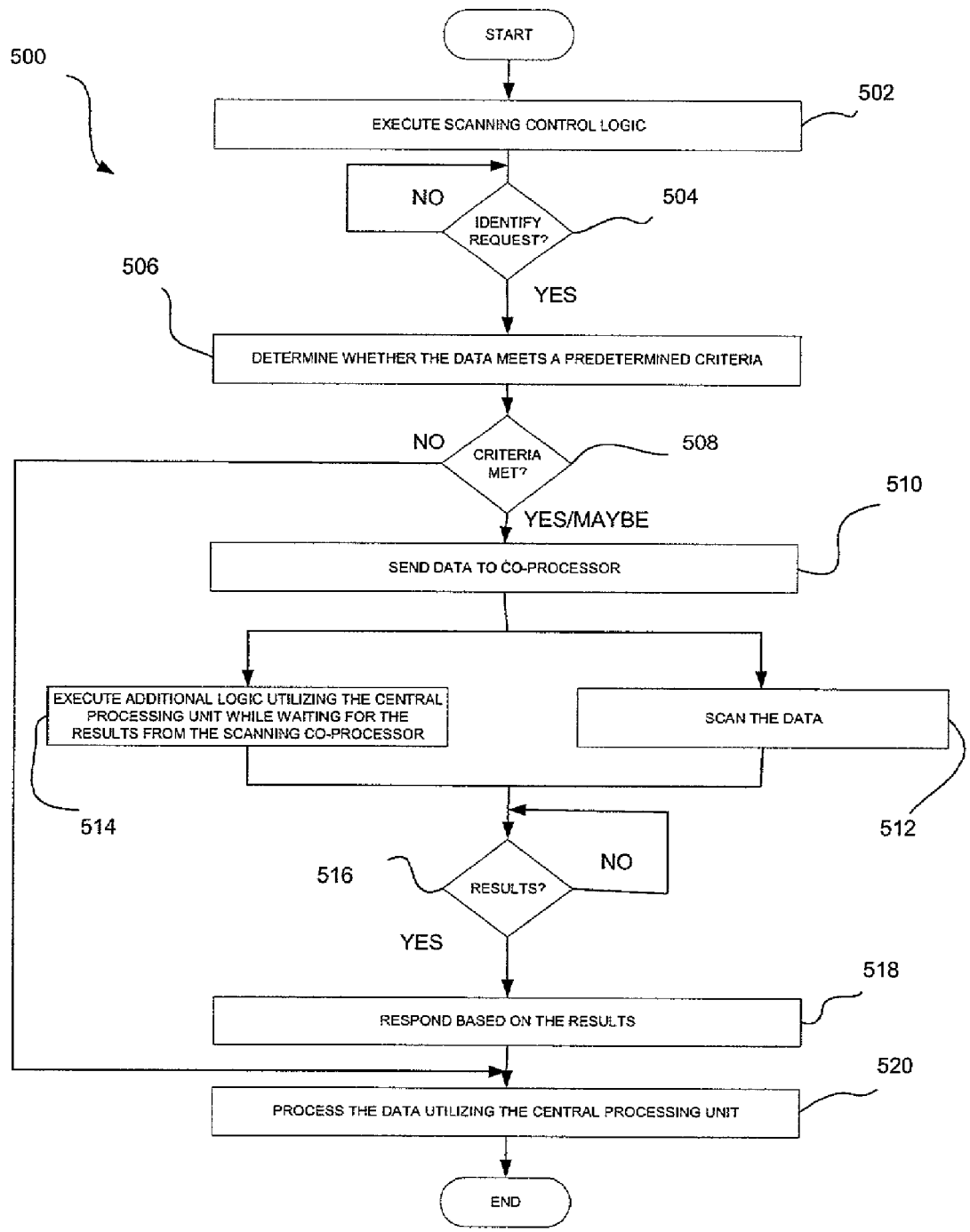
FIG. 5 illustrates a method for operating scanning control logic, in accordance with one embodiment.

FIG. 5 illustrates a method 500 for scanning data under the control of the scanning control logic set forth hereinabove. Initially, in operation 502 scanning control logic is executed utilizing the central processing unit. The scanning control logic may be executed automatically when the computer is booted up, manually executed by a user or software logic running by the bios., or at any other desired time. As mentioned earlier, the scanning control logic is capable of interfacing with an operating system of the central processing unit to identify requests to access/write data from/to memory or a network, process data, execute application programs, and/or any other requests involving data. It is determined in decision 504 whether a request relating to the data is identified during a wait routine.

In response to the identification of a request, it is determined whether the data meets a predetermined criteria in operation 506. It should be noted that the predetermined criteria may vary per the user or software logic running by the bios. For example, it is well known that certain data is less likely to be infected by malicious code, i.e. pictures, etc. Such data may be determined to not meet the predetermined criteria.

If it is determined in decision 508 that the criteria is met, the data is sent to the scanning co-processor along with a request that the data be scanned. As an option, a location of the data may be sent to the scanning co-processor (such as scanning co-processor 450). As is now readily apparent, any type of indication (i.e. the data itself, a location thereof, etc.) may be provided to the scanning co-processor so that the data may be scanned. As mentioned earlier, the scanning co-processor is equipped with or has access to scanning information, i.e. virus signatures, rule sets, etc., to perform virus scanning and/or content scanning. Such scanning information is used by the scanning control logic when the data is scanned in operation 512. More information regarding the scanning process of operation 512 will be set forth in greater detail during reference to FIG. 6.

Operating in parallel with the scan, the central processing unit is capable of executing additional logic while waiting for the results from the scanning co-processor. See operation 514. Of course, such additional logic may include accessing data from memory or a network, processing data, executing application programs, etc. As is now apparent, the scanning co-processor offloads the central processing unit by performing most if not all of the intensive virus and content scanning that would otherwise be performed on the central processing unit.

The scanning control logic then waits for the results of the scan. As an option, the scanning control logic may be carried out with the other additional logic to be executed utilizing a multi-threading algorithm. If it is determined in decision 516 that results have been received, an appropriate response may be initiated in operation 518. For example, if the results show that the data is clean, a notice may be provided indicating the same, or the data may simply be passed on to be processed. On the other hand, if the results indicate that the data is infected, a repair routine may be executed or the file may be deleted or the requested CPU logic action denied. Of course, any known response may be executed per the user or software logic running by the bios.

Finally, the data is processed utilizing the central processing unit in operation 520 with the knowledge that the data is clean, and thus will not harm the system. More importantly, this is determined without utilizing the resources of the central processing unit that was available to process other tasks/logic during the operation described above.

Figure 6:
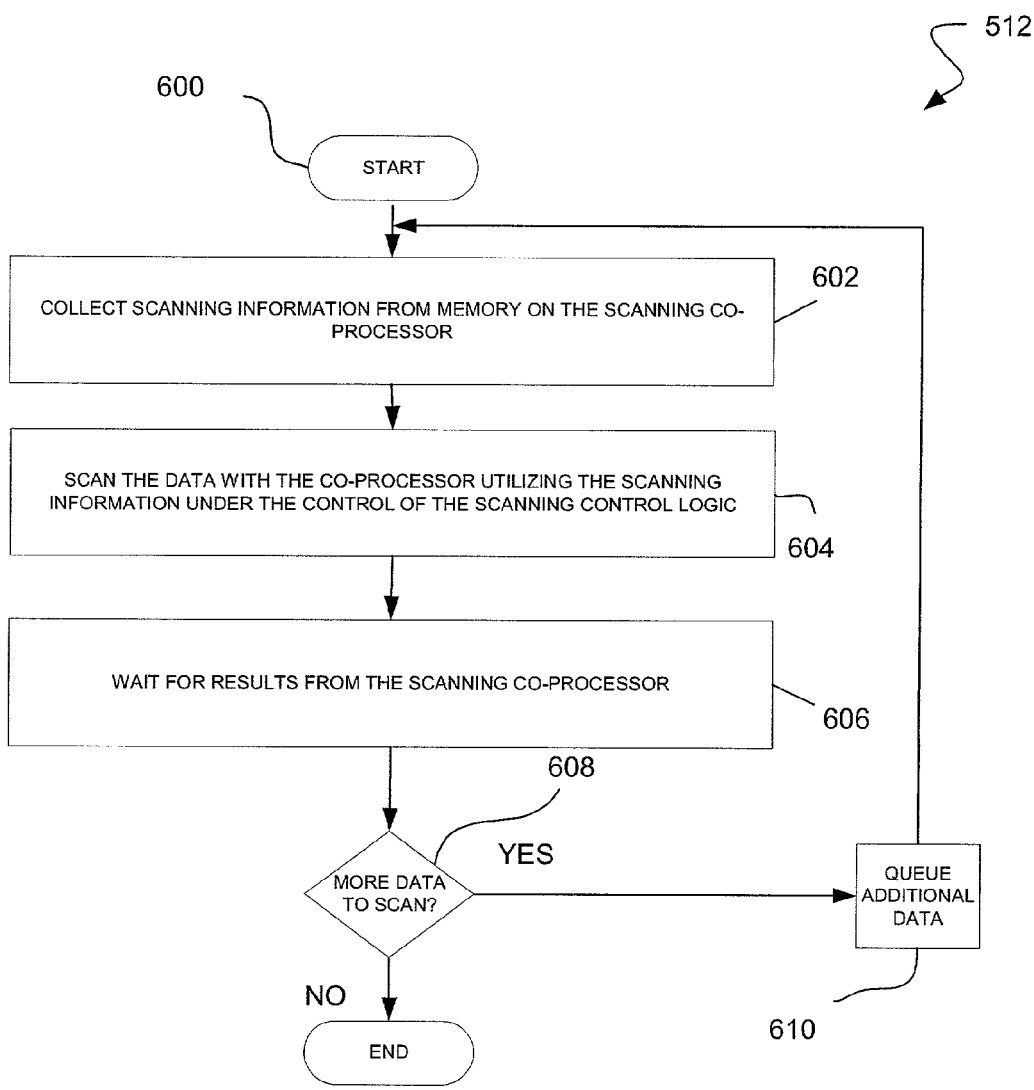
FIG. 6 illustrates a method for scanning data under the control of the scanning control logic.

FIG. 6 illustrates a method 600 of scanning data in accordance with operation 512 of FIG. 5. As shown, scanning information in the form of virus signatures, rule sets, or the like is collected in operation 602.

Next, in operation 604, the scanning information is utilized to perform the scan under the control of the scanning control logic. This may be accomplished by executing the rule sets, performing a comparison involving the virus signatures, or carrying out any other means of identifying the contents of files such as recursive scanning, decoding of file formats or conversion formats, or image recognition Once the scan has been initiated, the scanning control logic determines whether there is additional data to scan in decision 608. If so, such additional data is queued to be scanned by the scanning co-processor. Note operation 610. As an option, the additional data may be handled utilizing a multi-threading algorithm. Of course, scanning can be carried out jointly by the scanning co-processor and the central processing unit in a case where a large amount of data is queued to be scanned.

The scanning co-processor thus hands off the resource intensive scanning process to an additional optimized scanning processor, so as to not labor the central processing unit with the actual scan task.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for scanning data, comprising:
   a) executing scanning control logic utilizing a central processing unit;
   b) identifying a request related to data at the central processing unit;
   c) indicating a location of the data to a scanning co-processor coupled to the central processing unit so that the data is scanned by the scanning co-processor under the control of the scanning control logic for offloading scanning operations from the central processing unit;
   d) waiting for results from the scanning co-processor;
   e) executing additional logic utilizing the central processing unit while waiting for the results from the scanning co-processor; and
   f) initiating an event based on the results from the scanning co-processor;
      wherein the scanning co-processor is under the control of the central processing unit via the execution of the scanning control logic by the central processing unit;
      wherein it is determined whether the data meets a predetermined criteria, where the criteria is based on a type of a file associated with the data;
      wherein the data is sent to the scanning co-processor if it is determined that the data meets the predetermined criteria;
      wherein additional data to be scanned by the scanning co-processor is queued while waiting for the results from the scanning co-processor;
      wherein the scanning co-processor is capable of performing an additional scan on the additional data while scanning the data;
      wherein the location of the data indicated to the scanning co-processor includes a memory location of the data stored in memory, where the memory is separate from and coupled to the scanning co-processor and the central processing unit via a bus that employs direct memory access.

2. The method as recited in claim 1, and further comprising processing the data utilizing the central processing unit upon the receipt of favorable results from the scanning co-processor including a situation where malicious code is not detected.

3. The method as recited in claim 1, wherein the scanning control logic includes hardware.

4. The method as recited in claim 1, wherein the scanning control logic includes software.

5. The method as recited in claim 4, wherein the scanning control logic is stored in the memory.

6. The method as recited in claim 1, wherein the event is initiated under the control of the scanning control logic.

7. The method as recited in claim 1, wherein the scanning co-processor performs content scanning.

8. The method as recited in claim 1, wherein the scanning co-processor performs virus scanning.

9. The method as recited in claim 1, wherein the scanning co-processor includes additional memory.

10. The method as recited in claim 9, wherein virus signatures are stored in the additional memory.

11. The method as recited in claim 9, wherein rule sets are stored in the additional memory.

12. The method as recited in claim 1, wherein the criteria is further based on a user.

13. The method as recited in claim 1, wherein the criteria is further based on software logic mm by a bios.

14. The method as recited in claim 1, wherein the scanning control logic is executed automatically.

15. The method as recited in claim 1, wherein the scanning control logic is executed manually by a user.

16. The method as recited in claim 1, wherein the central processing unit aids the scanning co-processor when a large amount of data is to be scanned.

17. A method for scanning data, comprising:
a) executing scanning control logic utilizing a central processing unit;
b) identifying a request related to data at the central processing unit;
c) indicating the data to a scanning co-processor coupled to the central processing unit so that the data is scanned by the scanning co-processor under the control of the scanning control logic for offloading scanning operations from the central processing unit;
d) waiting for results from the scanning co-processor;
e) executing additional logic utilizing the central processing unit while waiting for the results from the scanning co-processor; and
f) initiating an event based on the results from the scanning co-processor;
   wherein the scanning co-processor is under the control of the central processing unit via the execution of the scanning control logic by the central processing unit;
   wherein it is determined whether the data meets a predetermined criteria, where the criteria is based on a type of a file associated with the data;
   wherein the data is sent to the scanning co-processor if it is determined that the data meets the predetermined criteria;
   wherein additional data to be scanned by the scanning co-processor is queued while waiting for the results from the scanning co-processor;
   wherein the central processing unit is coupled to the scanning co-processor via a bus.

18. The method as recited in claim 17, wherein the scanning control logic is stored on the scanning co-processor.

19. A computer program product embodied on a tangible computer readable medium, comprising:
a) computer code for executing scanning control logic utilizing a central processing unit;
b) computer code for identifying a request related to data at the central processing unit;
c) computer code for indicating a location of the data to a scanning co-processor coupled to the central processing unit so that the data is scanned by the scanning co-processor under the control of the scanning control logic for offloading scanning operations from the central processing unit;
d) computer code for waiting for results from the scanning co-processor;
e) computer code for executing additional logic utilizing the central processing unit while waiting for the results from the scanning co-processor; and
f) computer code for initiating an event based on the results from the scanning co-processor;
   wherein the scanning co-processor is under the control of the central processing unit via the execution of the scanning control logic by the central processing unit;
   wherein the computer program product is operable such that it is determined whether the data meets a predetermined criteria, where the criteria is based on a type of a file associated with the data;
   wherein the computer program product is operable such that the data is sent to tie scanning co-processor if it is determined that the data meets the predetermined criteria;
   wherein the computer program product is operable such that additional data to be scanned by the scanning co-processor is queued while waiting for the results from the scanning co-processor;
   wherein the scanning co-processor is capable of performing an additional scan on the additional data while scanning the data;
   wherein the location of the data indicated to the scanning co-processor includes a memory location of the data stored in memory, where the memory is separate from and coupled to the scanning co-processor and the central processing unit via a bus that employs direct memory access.

20. The computer program product as recited in claim 19, and further comprising computer code for processing the data utilizing the central processing unit upon the receipt of favorable results from the scanning co-processor including a situation where malicious code is not detected.

21. The computer program product as recited in claim 19, wherein the scanning control logic includes hardware.

22. The computer program product as recited in claim 21, wherein the scanning control logic is stored on the scanning co-processor.

23. The computer program product as recited in claim 19, wherein the scanning control logic includes software.

24. The computer program product as recited in claim 23, wherein the scanning control logic is stored in the memory.

25. The computer program product as recited in claim 19, wherein the event is initiated under the control of the scanning control logic.

26. The computer program product as recited in claim 19, wherein the scanning co-processor performs content scanning.

27. The computer program product as recited in claim 19, wherein the scanning co-processor performs virus scanning.

28. The computer program product as recited in claim 19, wherein the scanning co-processor includes additional memory.

29. The computer program product as recited in claim 28, wherein virus signatures are stored in the additional memory.

30. The computer program product as recited in claim 28, wherein rule sets are stored in the additional memory.

31. A computer program product embodied on a tangible computer readable medium, comprising:
a) computer code for executing scanning control logic utilizing a central processing unit;
b) computer code for identifying a request related to data at the central processing unit;
c) computer code for indicating a location of the data to a scanning co-processor coupled to the central processing unit so that the data is scanned by the scanning co-processor under the control of the scanning control logic for offloading scanning operations from the central processing unit;
d) computer code for waiting for results from the scanning co-processor;
e) computer code for executing additional logic utilizing the central processing unit while waiting for the results from the scanning co-processor; and
f) computer code for initiating an event based on the results from the scanning co-processor;
   wherein the scanning co-processor is under the control of the central processing unit via the execution of the scanning control logic by the central processing unit;
   wherein the computer program product is operable such that it is determined whether the data meets a predetermined criteria, where the criteria is based on a type of a file associated with the data;

wherein the computer program product is operable such that the data is sent to the scanning co-processor if it is determined that the data meets the predetermined criteria;

wherein the computer program product is operable such that additional data to be scanned by the scanning co-processor is queued while waiting for the results from the scanning co-processor;

wherein the central processing unit is coupled to the scanning co-processor via a bus.

32. A system including a tangible computer readable medium, comprising:
one or more processors executing:
a) logic for executing scanning control logic utilizing a central processing unit;
b) logic for identifying a request related to data at the central processing unit;
c) logic for indicating a location of the data to a scanning co-processor coupled to the central processing unit so that the data is scanned by the scanning co-processor under the control of the scanning control logic for offloading scanning operations from the central processing unit;
d) logic for waiting for results from the scanning co-processor;
e) logic for executing additional logic utilizing the central processing unit while waiting for the results from the scanning co-processor; and
f) logic for initiating an event based on the results from the scanning co-processor; wherein the scanning co-processor is under the control of the central processing unit via the execution of the scanning control logic by the central processing unit;
wherein the system is operable such that it is determined whether the data meets a predetermined criteria, where the criteria is based on a type of a file associated with the data;
wherein the system is operable such that the data is sent to the scanning co-processor if it is determined that the data meets the predetermined criteria;
wherein the system is operable such that additional data to be scanned by the scanning co-processor is queued while waiting for the results from the scanning co-processor;
wherein the scanning co-processor is capable of performing an additional scan on the additional data while scanning the data;
wherein the location of the data indicated to the scanning co-processor includes a memory location of the data stored in memory, where the memory is separate from and coupled to the scanning co-processor and the central processing unit via a bus that employs direct memory access.

33. A method for scanning data, comprising:
a) executing scanning control logic utilizing a central processing unit;
b) identifying a request related to data at the central processing unit;
c) determining whether the data meets a predetermined criteria utilizing the central processing unit under the control of the scanning control logic;
d) indicating a location of the data to a scanning co-processor coupled to the central processing unit if it is determined that the data meets the predetermined criteria;
e) collecting scanning information from additional memory on the scanning co-processor;
f) scanning the data with the scanning co-processor utilizing the scanning information under the control of the scanning control logic for offloading scanning operations from the central processing unit;
g) waiting for results from the scanning co-processor;
h) executing additional logic utilizing the central processing unit while waiting for the results from the scanning co-processor;
i) queuing additional data to be scanned by the scanning co-processor while waiting for the results from the scanning co-processor;
j) initiating a security event upon the receipt of unfavorable results from the scanning co-processor including a situation where malicious code is detected; and
k) processing the data utilizing the central processing unit upon the receipt of favorable results from the scanning co-processor including a situation where malicious code is not detected;
wherein the scanning co-processor is under the control of the central processing unit via the execution of the scanning control logic by the central processing unit;
wherein the criteria is based on a type of a file associated with the data;
wherein the scanning co-processor is capable of performing an additional scan on the additional data while scanning the data;
wherein the location of the data indicated to the scanning co-processor includes a memory location of the data stored in memory, where the memory is separate from and coupled to the scanning co-processor and the central processing unit via a bus that employs direct memory access.

34. A system including tangible computer readable medium for scanning data, comprising:
a) means for executing scanning control logic utilizing a central processing unit;
b) means for identifying a request related to data at the central processing unit;
c) means for determining whether the data meets a predetermined criteria utilizing the central processing unit under the control of the scanning control logic;
d) means for indicating a location of the data to a scanning co-processor coupled to the central processing unit if it is determined that the data meets the predetermined criteria;
e) means for collecting scanning information from additional memory on the scanning co-processor;
f) means for scanning the data with the scanning co-processor utilizing the scanning information under the control of the scanning control logic for offloading scanning operations from the central processing unit;
g) means for waiting for results from the scanning co-processor;
h) means for executing additional logic utilizing the central processing unit while waiting for the results from the scanning co-processor;
i) means for queuing additional data to be scanned by the scanning co-processor while waiting for the results from the scanning co-processor;
j) means for initiating a security event upon the receipt of unfavorable results from the scanning co-processor including a situation where malicious code is detected; and k) means for processing the data utilizing the central processing unit upon the receipt of favorable results from the scanning co-processor including a situation where malicious code is not detected;
- wherein the scanning co-processor is under the control of the central processing unit via the execution of the scanning control logic by the central processing unit;
- wherein the criteria is based on a type of a file associated with the data;
- wherein the scanning co-processor is capable of performing an additional scan on the additional data while scanning the data;
- wherein the location of the data indicated to the scanning co-processor includes a memory location of the data stored in memory, where the memory is separate from and coupled to the scanning co-processor and the central processing unit via a bus that employs direct memory access.

35. A system, comprising:
a) means for executing scanning control logic utilizing a central processing unit;
b) means for identifying a request related to data at the central processing unit;
c) means for determining whether the data meets a predetermined criteria utilizing the central processing unit under the control of the scanning control logic;
d) means for indicating a location of the data to a scanning co-processor coupled to the central processing unit if it is determined that the data meets the predetermined criteria;
e) means for collecting scanning information from additional memory on the scanning co-processor;
f) means for scanning the data with the scanning co-processor utilizing the scanning information under the control of the scanning control logic for offloading scanning operations from the central processing unit;
g) means for waiting for results from the scanning co-processor;
h) means for executing additional logic utilizing the central processing unit while waiting for the results from the scanning co-processor;
i) means for queuing additional data to be scanned by the scanning co-processor while waiting for the results from the scanning co-processor;
j) means for initiating a security event upon the receipt of unfavorable results from the scanning co-processor including a situation where malicious code is detected; and
k) means for processing the data utilizing the central processing unit upon the receipt of favorable results from the scanning co-processor including a situation where malicious code is not detected;
- wherein the scanning co-processor is under the control of the central processing unit via the execution of the scanning control logic by the central processing unit;
- wherein the criteria is based on a type of a file associated with the data;
- wherein the system is operable such that the scanning information is updated via a network periodically.

36. The system as recited in claim 34, wherein the additional logic to be executed and the additional data queued to be scanned are handled utilizing multi-threading algorithms.

37. A method for scanning data, comprising:
a) executing scanning control logic utilizing a central processing unit;
b) identifying a request related to data at the central processing unit;
c) indicating the data to a scanning co-processor coupled to the central processing unit so that the data is scanned by the scanning co-processor under the control of the scanning control logic for offloading scanning operations from the central processing unit;
d) waiting for results from the scanning co-processor;
e) executing additional logic utilizing the central processing unit while waiting for the results from the scanning co-processor; and
f) initiating an event based on the results from the scanning co-processor;
- wherein the scanning co-processor is under the control of the central processing unit via the execution of the scanning control logic by the central processing unit;
- wherein it is determined whether the data meets a predetermined criteria, where the criteria is based on a type of a file associated with the data;
- wherein the data is sent to the scanning co-processor if it is determined that the data meets the predetermined criteria;
- wherein additional data to be scanned by the scanning co-processor is queued while waiting for the results from the scanning co-processor;
- wherein the scanning control logic is executed automatically when a computer is booted up.

38. A method for scanning data, comprising:
a) executing scanning control logic utilizing a central processing unit;
b) identifying a request related to data at the central processing unit;
c) indicating the data to a scanning co-processor coupled to the central processing unit so that the data is scanned by the scanning co-processor under the control of the scanning control logic for offloading scanning operations from the central processing unit;
d) waiting for results from the scanning co-processor;
e) executing additional logic utilizing the central processing unit while waiting for the results from the scanning co-processor; and
f) initiating an event based on the results from the scanning co-processor;
- wherein the scanning co-processor is under the control of the central processing unit via the execution of the scanning control logic by the central processing unit;
- wherein it is determined whether the data meets a predetermined criteria, where the criteria is based on a type of a file associated with the data;
- wherein the data is sent to the scanning co-processor if it is determined that the data meets the predetermined criteria;
- wherein additional data to be scanned by the scanning co-processor is queued while waiting for the results from the scanning co-processor;
- wherein the scanning control logic is executed using software logic run by a bios.

* * * * *